(12) United States Patent
Shmulyan

(10) Patent No.: US 11,682,058 B1
(45) Date of Patent: Jun. 20, 2023

(54) TECHNOLOGIES FOR PROVIDING INVENTORY INFORMATION TO WEB-CONNECTED USERS

(71) Applicant: Yelizaveta M. Shmulyan, Seattle, WA (US)

(72) Inventor: Yelizaveta M. Shmulyan, Seattle, WA (US)

(*) Notice: Subject to any disclaimer, the term of this patent is extended or adjusted under 35 U.S.C. 154(b) by 0 days.

(21) Appl. No.: 17/206,668

(22) Filed: Mar. 19, 2021

Related U.S. Application Data (60) Provisional application No. 62/992,108, filed on Mar. 19, 2020.

(51) Int. Cl.
 *G06Q 30/00* (2023.01)
 *G06Q 30/0601* (2023.01)
 *G06Q 10/087* (2023.01)
 *G06Q 50/00* (2012.01)

(52) U.S. Cl.
 CPC ....... *G06Q 30/0623* (2013.01); *G06Q 10/087* (2013.01); *G06Q 30/0605* (2013.01); *G06Q 30/0639* (2013.01); *G06Q 50/01* (2013.01)

(58) Field of Classification Search
 CPC ............. G06Q 30/0623; G06Q 10/087; G06Q 30/0605; G06Q 30/0639; G06Q 50/01
 See application file for complete search history.

(56) References Cited

U.S. PATENT DOCUMENTS

| | | | | |
|---|---|---|---|---|
| 10,275,526 B2 * | 4/2019 | Dodge | ................. | G06F 16/29 |
| 10,332,179 B2 * | 6/2019 | Desmarais | ............. | G01B 11/24 |
| 11,232,399 B1 * | 1/2022 | Calvin | ............... | G06Q 10/0833 |
| 2002/0077937 A1 * | 6/2002 | Lyons | ................... | G06Q 30/06 |
| | | | | 705/28 |
| 2005/0015307 A1 * | 1/2005 | Simpson | ................. | G06Q 30/02 |
| | | | | 705/26.61 |
| 2007/0150312 A1 * | 6/2007 | Schmidt | ............. | G06Q 30/0601 |
| | | | | 705/26.1 |
| 2009/0319295 A1 * | 12/2009 | Kass-Hout | ............. | G16H 50/80 |
| | | | | 707/999.102 |
| 2014/0379526 A1 * | 12/2014 | Parham | .............. | G06Q 30/0633 |
| | | | | 705/26.41 |
| 2015/0100433 A1 * | 4/2015 | Choy | ................. | G06Q 30/0269 |
| | | | | 705/14.69 |
| 2017/0147966 A1 * | 5/2017 | Aversa | ................. | G06Q 10/087 |
| 2018/0182013 A1 * | 6/2018 | Haubold | ............ | G06Q 30/0625 |

(Continued)

OTHER PUBLICATIONS

Zheng Qin, "Introduction to E-commerce", 2009, Springer, springer.com (Year: 2009).*

(Continued)

*Primary Examiner* — Michelle T Kringen
*Assistant Examiner* — Norman Donald Sutch, Jr.

(57) ABSTRACT

My website and application will aggregate the data from most of the stores in the area carrying the products, which are in actual scarcity or could become scarce. The consumer will indicate which product they need and indicate their address or give the website and/or application access to their current location, and the website and/or application will show the consumer the nearest store with the product they need currently in stock, and indicate whether it is limited in stock. It will also give information on the product (price, brand, size, other relevant details) and the store (such as address, hours, location).

8 Claims, 7 Drawing Sheets

(56) References Cited

U.S. PATENT DOCUMENTS

2018/0189720 A1* 7/2018 Henderson ........... G06Q 10/087
2022/0241623 A1* 8/2022 Ellison ................. A62B 23/025

OTHER PUBLICATIONS walgreens.com; "Hand Sanitizer | Walgreens"; Mar. 4, 2020; https://web.archive.org/web/20200304071034/https://www.walgreens.com/store/c/hand-sanitizer/ID=360353-tier3 (Year: 2020).*
Southam Newspapers; "Map plots flu's targets"; Nov. 14, 2002; The Windsor Star (Year: 2002).*

* cited by examiner

Fig. 1

| Product: | Location: |
|---|---|
| Hand Sanitizer | 98109 |

| | Price: $3.99 | Store: Target |
|---|---|---|
| Up+Up | Size: 32 fl. Oz<br>Brand: Up + Up<br>Limited Supply | Northgate<br>302 NE Northgate<br>206-494-0897<br>7:00AM – 11:00PM |

| | Price: $1.99 | Store: Walgreen's |
|---|---|---|
| Purell | Size: 20 fl. Oz<br>Brand: Purrell<br>2-5 in stock | 222 Pike Street<br>206-903-8392<br>7:00AM – 11:00PM |

| | Price: $1.59 | Store: CVS |
|---|---|---|
| CVS Sanitizer | Size: 20 fl. Oz<br>Brand: CVS Health<br>Low Stock | 117 SW 160th Street<br>206-242-2030<br>8:00AM – 10:00PM |

Fig. 2

Live Feed:

Product: Hand Sanitizers

Mandy says there is a limited supply of sanitizers at Target – 302 NE Northgate

Joe says there is a limited supply of sanitizers at Walgreens at 222 Pike Street Rick says there is a limited supply of sanitizers at CVS at 117 SW 160$^{th}$ street

Information:

- New CDC advice...
- All universities closed
- All nursing homes no longer accepting visitors
- All bars and restaurants closed, only takeout allowed
- Advice to practice social distancing

Fig. 7

TECHNOLOGIES FOR PROVIDING INVENTORY INFORMATION TO WEB-CONNECTED USERS

CROSS-REFERENCE TO RELATED APPLICATION

This patent application claims benefit to the U.S. Provisional Application No. 62/992,108 filed on Mar. 19, 2020, the complete disclosure of which, in its entirety, is incorporated by reference.

FIELD

This application relates in general to a system and method for providing information for web-connected users for COVID-19 response, and, more particularly, to providing inventory information to Web-connected users.

BACKGROUND

My invention is for a website and mobile application. During the Coronavirus pandemic, there have been severe shortages of necessities such as hand sanitizer, toilet paper, and masks. This phenomenon has been well documented all over the media. In this time of lack, many stores (retailers, pharmacies, grocery stores) do not offer to deliver products to peoples' home, but they are intermittently available in store with new shipments. E-commerce sites that do offer to ship these necessities that are in severe lack sometimes do so but at a much higher and prohibitive cost. Thus, often, the only option is to buy these necessities in-store when they are available. However, most stores are often sold out of these necessities. The outlets or locations that do have inventories may be far away. Some stores may publish their product inventory online and may indicate which of their outlets or locations still have them in stock. They may indicate whether these necessities are in limited supply.

SUMMARY

My website and application will aggregate the data from most stores in the area carrying the products, which are in scarcity. Here area may depend upon the availability of transportation to the shopper and the immediate environs. For instance, an urbanite who does not own a car, may only be able to patronize stores within a reasonable walking distance or via public transportation.

On the other hand, suburbanite may easily be able to walk a moderate distance to get to a store that has the item sought. The consumer will indicate which product they need and indicate their address or give the website and/or application access to their current location, and the website and/or application will show the consumer the nearest store with the product they need currently in stock, and indicate whether it is limited in stock. The website will also provide an information on the product (price, brand, size, other relevant details) and the store (such as address, hours, location). The website will have several sorting mechanisms: 1. Pure proximity—the website and/or application will show stores with the product in stock purely based on closest proximity and 2. Supply—the website and/or application will sort first by stores which have more than just a "limited" supply and then sort those stores based on proximity. The purpose of this feature is for consumers who don't want to be disappointed that all of the stock is sold out once they arrive.

Consumers can also post in the app whether they saw any of the products in stock and indicate in what quantity (limited, in supply). This can address any data inaccuracies. This can also serve as a real-time feed of where consumers are saying they saw the product in stock.

Additionally, the consumer can indicate on the website and/or application their preferred location to pick up the product they need. If it is currently out of stock there, they can indicate which product they need that is carried in that store, enter in their phone-number or e-mail address and receive a push notification when the product does become available in that store.

Moreover, the consumer can indicate if they want to order "online only" the product they need on the website or application. This feature will show what are the currently available deals online, including product information and pricing, that do ship directly to home and direct the consumer to those deals.

For certain products, such as protective face masks, there can be a feature to indicate urgency. If stores have protective face masks available, the consumer can indicate if they need it urgently, for example if he has coronavirus or he is a caretaker of an elderly person. Through this mechanism, he can indicate the severity of their need and stores can put these items on hold for people that are particularly needy.

Furthermore, the website and application will have updates on the coronavirus pandemic, including case counts, school and road closures, public event closures, and more.

While the invention has been particularly shown and described as referenced to the embodiments thereof, those skilled in the art will understand that the foregoing and other changes in form and detail may be made therein without departing from the spirit and scope.

DETAIL DESCRIPTION

Figure 1:
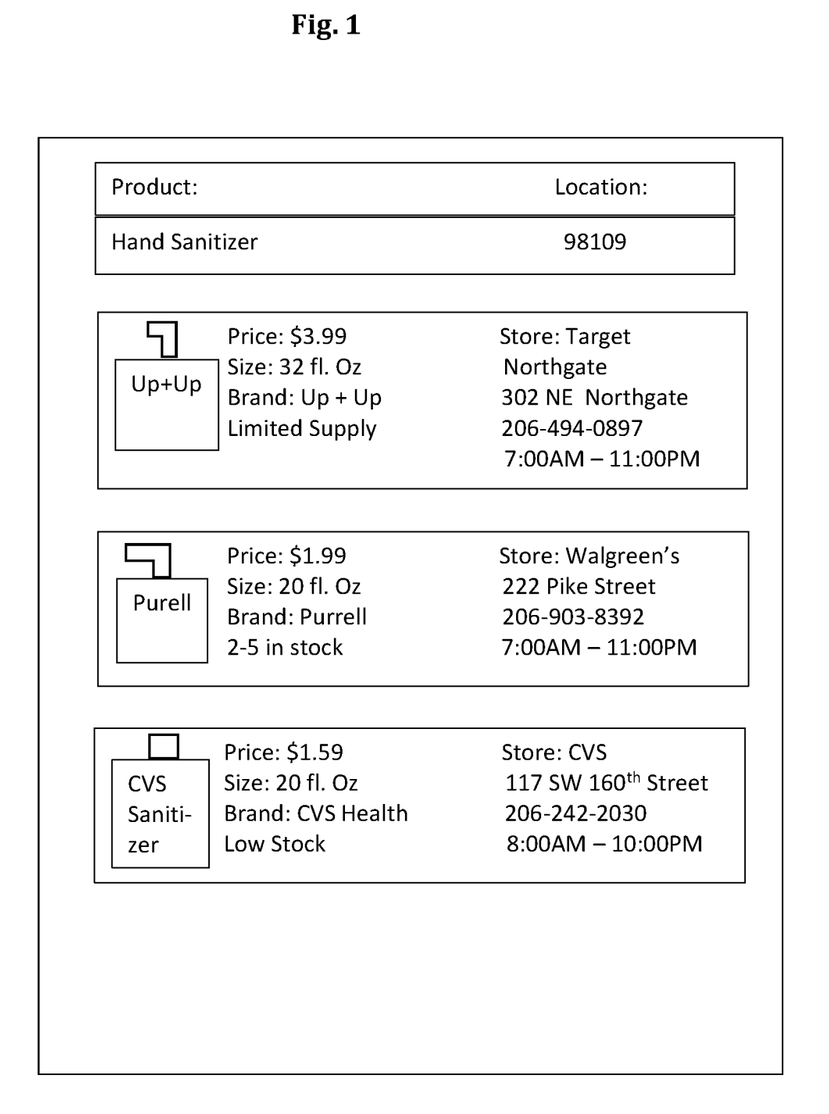
FIG. 1 is a screen shot showing, by way of example, a user request interface.
Figure 2:
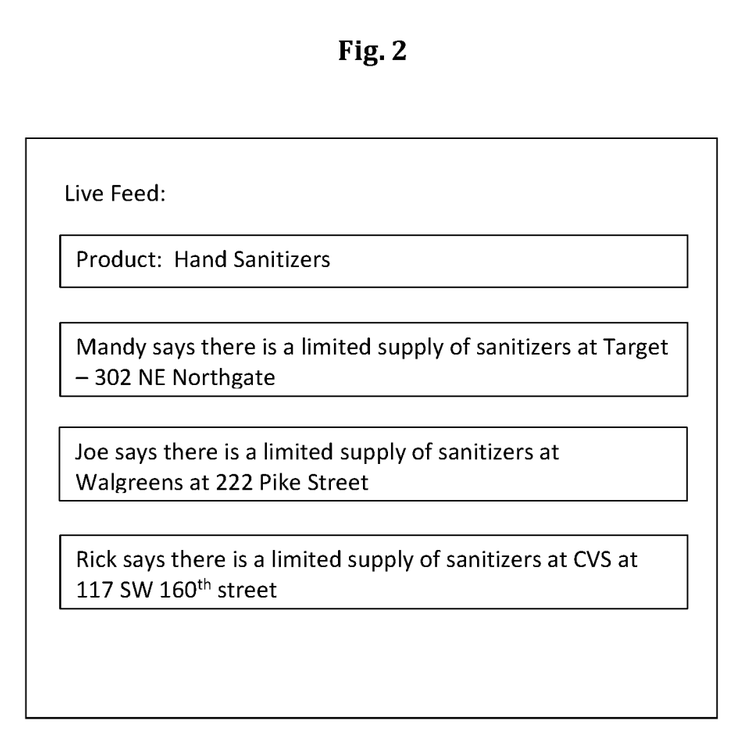
FIG. 2 is a screen shot showing, by way of example, information and real-time feed of customers' updates of stores with product in stock.
Figure 3:
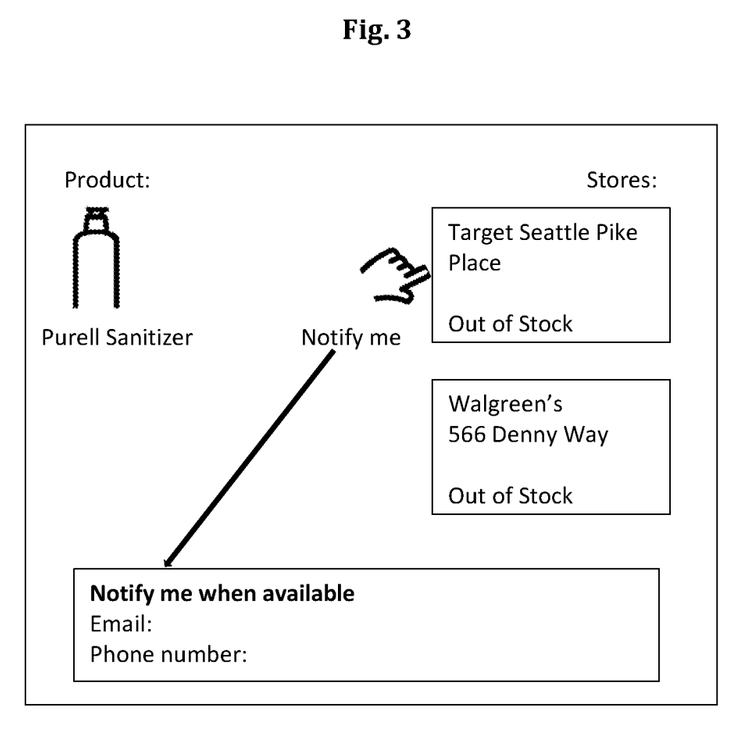
FIG. 3 is a screen shot showing, by way of example, notification for user when her preferred store has product available.
Figure 4:
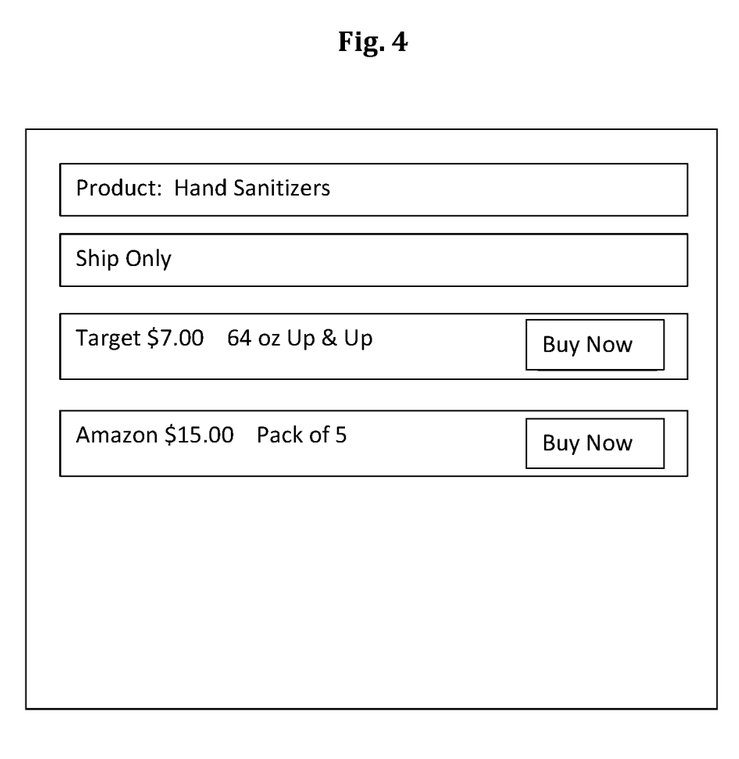
FIG. 4 is a screen shot showing, by way of example, places that do product delivery.
Figure 5:
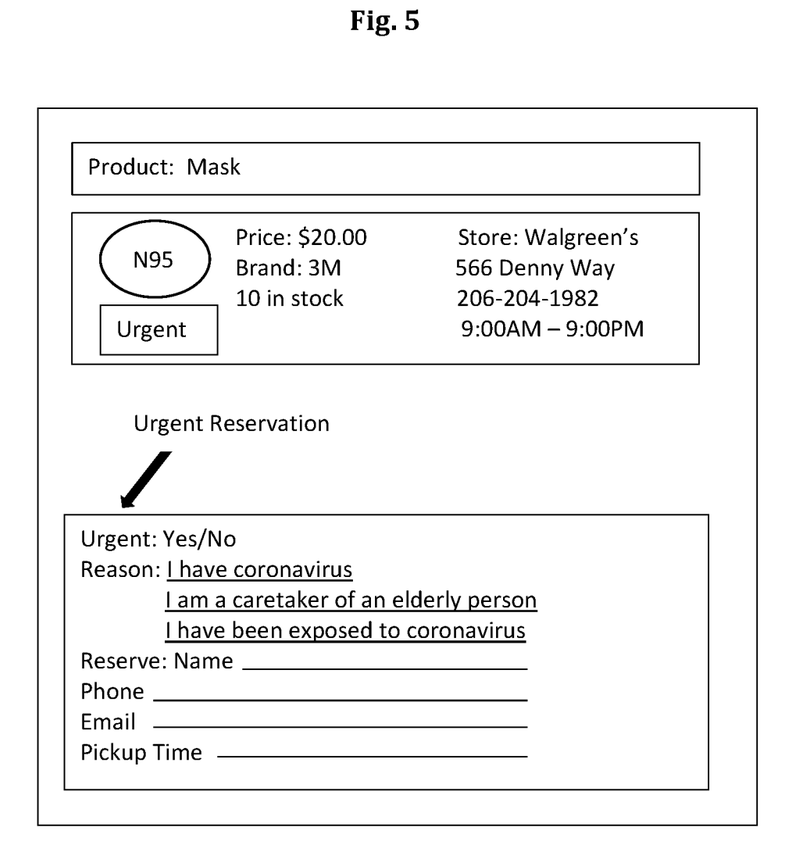
FIG. 5 is a screen shot showing, by way of example, urgent users' reservation of products in limited supply.
Figure 6:
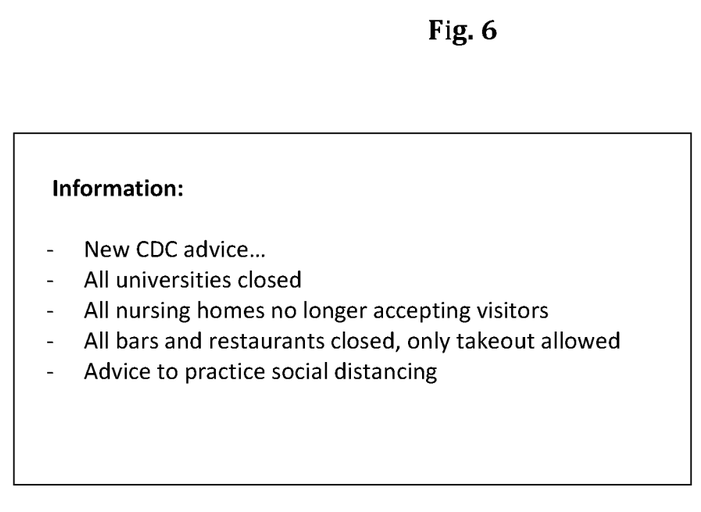
FIG. 6 is a screen shot showing, by way of example, information updates with regards to COVID-19.
Figure 7:
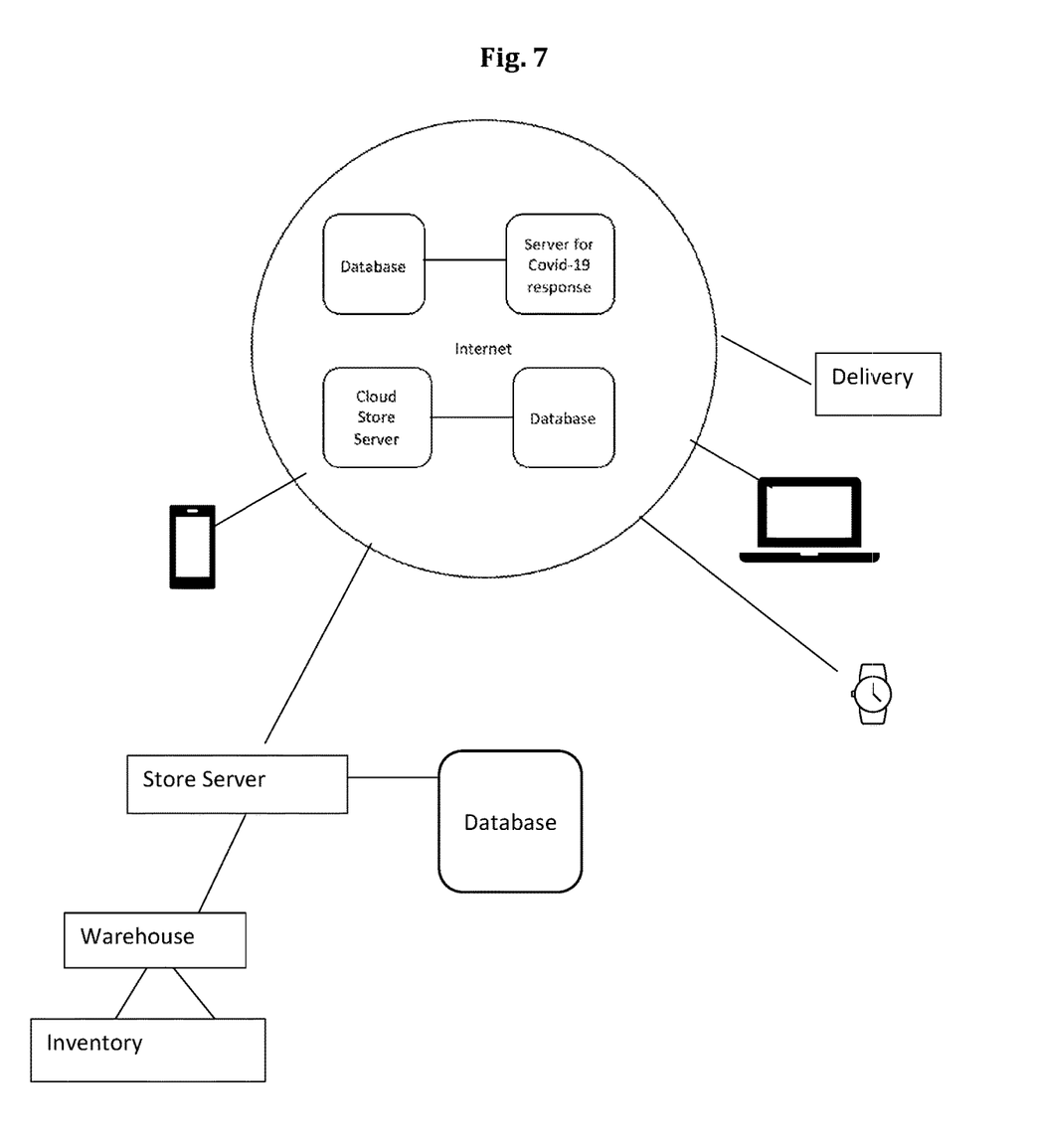
FIG. 7 is a block diagram showing system and method for COVID-19 response in accordance with one embodiment.

My website and application will aggregate the data from most of the stores in the area carrying the products, which are in actual scarcity or could become scarce. The consumer will indicate which product they need and indicate their address or give the website and/or application access to their current location, and the website and/or application will show the consumer the nearest store with the product they need currently in stock, and indicate whether it is limited in stock. It will also give information on the product (price, brand, size, other relevant details) and the store (such as address, hours, location).

The website will have several sorting mechanisms: 1. Pure proximity—the website and/or application will show stores with the product in stock purely based on closest proximity and 2. Supply—the website or application will sort first by stores which have more than just a "limited" supply or restricted availability and then sort those stores based on proximity. The purpose of this feature is for consumers who do not want to be disappointed that most of the stock inventory is sold out once they arrive.

Additionally, the consumer can indicate on the website or application their preferred location to pick up the product they need. If it is currently out of stock there, they can indicate which product they need that is carried in that store, enter in their phone-number of e-mail address and receive a push notification when the product does become available in that store. Additionally, the consumer can indicate if they want to order "online only" for the product they need on the website or application. This feature will show what are the currently available deals online, including product information and pricing. These products would ship directly to customers' houses. The website would be able to direct consumers to those deals. For certain products, such as face protective masks, there can be a feature to indicate urgency. If stores have masks available, the consumer can indicate if they need it urgently, for example, if he has coronavirus or if he is a caretaker of an elderly person. Through this mechanism, customers can indicate the severity of their need and stores can put these items on hold for those that are particularly needy. Additionally, the website and application will have updates on the coronavirus pandemic, including case counts, school and road closures, public event closures, and more.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

What is claimed:

1. One or more non-transitory, computer-readable media having instructions that, when executed by one or more processors, cause a server device to:
   receive, from a first application disposed on a first client device via a computer network, location information associated with the first client device and a request related to a product that is to prevent spread of an infectious disease, the request to include an urgency indication to indicate a severity of a user's need for the product and an indication of a transportation mode of the user, wherein the first application is a web browser or mobile application that is to render a graphical user interface on the first client device with a plurality of user input fields to receive user input associated with the product, the urgency indication, and the indication of the transportation mode;
   obtain, from one or more stores, data related to the product;
   identify an area of proximity based on the location information and the indication of the transportation mode;
   filter the data related to the product based on the area of proximity to identify first inventory information from a store of the one or more stores;
   obtain, from a second application disposed on a second client device of a customer of the store, second inventory information related to the product, wherein the second inventory information is based on the customer observing the product's stock at the store; and
   provide, to the first application on the first client device via the computer network, first information about availability of the product at the store based on the first inventory information, second information about real-time feedback of the product's stock at the store based on the second inventory information, and third information about one or more closures associated with the infectious disease, wherein the first application is to render the graphical user interface on the first client device with a plurality of user output fields with: indications associated with the first information, a live feed associated with the second inventory information, and indications associated with third information.

2. The one or more non-transitory, computer-readable media of claim 1, wherein the one or more stores includes a plurality of stores that are associated with at least two different companies.

3. The one or more non-transitory, computer-readable media of claim 1, wherein the first information about availability of the product includes information about availability of a plurality of brands of the product.

4. The one or more non-transitory, computer-readable media of claim 1, wherein the first information about availability of the product indicates that the product is out-of-stock and the instructions, when executed, further cause the device to:
   receive, from the user, contact information; and
   notify the user when the product becomes available.

5. A server comprising:
   memory to store instructions; and
   processing circuitry, coupled with the memory, to execute the instructions to provide an application that is to:
   receive, from a first application disposed on a first client device via a computer network, location information associated with the first client device and a request related to a product that is to prevent spread of an infectious disease, the request to include an urgency indication to indicate a severity of a user's need for the product and an indication of a transportation mode of the user, wherein the first application is a web browser or mobile application that is to render a graphical user interface on the first client device with a plurality of user input fields to receive user input associated with the product, the urgency indication, and the indication of the transportation mode;
   obtain, from one or more stores, data related to the product;
   identify an area of proximity based on the location information and the indication of the transportation mode;
   filter the data related to the product based on the area of proximity to identify first inventory information from a store of the one or more stores;
   obtain, from a second application disposed on a second client device of a customer of the store, second inventory information related to the product, wherein the second inventory information is based on the customer observing the product's stock at the store; and
   provide, to the first application on the first client device via the computer network, first information about availability of the product at the store based on the first inventory information, second information about real-time feedback of the product's stock at the store based on the second inventory information, and third information about one or more closures associated with the infectious disease, wherein the first application is to render the graphical user interface on the first client device with a plurality of user output fields with: indications associated with the first information, a live feed associated with the second inventory information, and indications associated with third information.

6. The server of claim 5, wherein the one or more stores includes a plurality of stores that are associated with at least two different companies.

7. The server of claim 5, wherein the first information about availability of the product includes information about availability of a plurality of brands of the product.

8. The server of claim 5, wherein the first information about availability of the product indicates that the product is out-of-stock and the application is further to:
    receive, from the user, contact information; and
    notify the user when the product becomes available.

\* \* \* \* \*